(12) United States Patent
Ott et al.

(10) Patent No.: US 10,807,163 B2
(45) Date of Patent: Oct. 20, 2020

(54) ADDITIVE MANUFACTURED SURFACE FINISH

(71) Applicant: UNITED TECHNOLOGIES CORPORATION, Hartford, CT (US)

(72) Inventors: Joe Ott, Enfield, CT (US); Stanley J Funk, Southington, CT (US); Roger O Coffey, Glastonbury, CT (US); Shawn Stempinski, Simsbury, CT (US); John J Rup, Jr., Willington, CT (US); Lyutsia Dautova, Rocky Hill, CT (US); Dennis M Moura, South Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 1164 days.

(21) Appl. No.: 14/798,582

(22) Filed: Jul. 14, 2015

(65) Prior Publication Data

US 2016/0010863 A1   Jan. 14, 2016

Related U.S. Application Data

(60) Provisional application No. 62/024,023, filed on Jul. 14, 2014.

(51) Int. Cl.
   F28F 3/04      (2006.01)
   F28F 13/18     (2006.01)
   (Continued)

(52) U.S. Cl.
   CPC ............ B22F 3/1055 (2013.01); F23R 3/002 (2013.01); F28F 3/04 (2013.01); F28F 13/185 (2013.01);
   (Continued)

(58) Field of Classification Search
   CPC .... F28F 3/04; F28F 3/042; F28F 3/044; F28F 3/046; F28F 3/048; F28F 13/18; F28F 13/182; F28F 13/185; F28F 13/187; F28F 2260/00; F28F 2230/02; B33Y 10/00; B33Y 80/00; B33Y 99/00; B22F 5/00; B22F 2005/005; B22F 5/006; B22F 5/009;
   (Continued)

(56) References Cited

U.S. PATENT DOCUMENTS

| 4,132,066 A | 1/1979 | Austin, Jr. et al. |
| 4,361,010 A | 11/1982 | Tanrikut et al. |

(Continued)

FOREIGN PATENT DOCUMENTS

| CN | 101526228 A | 9/2009 |
| CN | 102414511 A | 4/2012 |

(Continued)

OTHER PUBLICATIONS

Japanese office action for patent application No. 2015-137362 dated May 27, 2016.

(Continued)

*Primary Examiner* — Maria V Ewald
*Assistant Examiner* — Ethan A. Utt
(74) *Attorney, Agent, or Firm* — Bachman & LaPointe, P.C.

(57) ABSTRACT

An additively manufactured component includes a heat transfer augmentation feature with a surface finish between about 125-900 micro inches.

17 Claims, 6 Drawing Sheets

(51) Int. Cl.
  *B22F 3/105* (2006.01)
  *F23R 3/00* (2006.01)
  B22F 3/00 (2006.01)
  B22F 5/00 (2006.01)
(52) U.S. Cl.
  CPC .............. *B22F 3/008* (2013.01); *B22F 5/009* (2013.01); *F05B 2230/30* (2013.01); *F05D 2230/30* (2013.01); *F23R 2900/00018* (2013.01); *F23R 2900/03042* (2013.01); *F23R 2900/03044* (2013.01); *F28F 2255/18* (2013.01); *F28F 2260/00* (2013.01); *Y02P 10/295* (2015.11); *Y02T 50/675* (2013.01)
(58) Field of Classification Search
  CPC .. B22F 5/04; B22F 3/10; B22F 3/1055; B22F 3/00; B22F 3/008
  See application file for complete search history.

(56) References Cited

U.S. PATENT DOCUMENTS

| | | | |
|---|---|---|---|
| 4,498,288 A | 2/1985 | Vogt | |
| 4,944,151 A | 7/1990 | Hovnanian | |
| 5,123,248 A | 6/1992 | Monty et al. | |
| 5,331,816 A | 7/1994 | Able et al. | |
| 5,524,438 A | 6/1996 | Johnson et al. | |
| 5,975,850 A | 11/1999 | Abuaf et al. | |
| 6,142,734 A * | 11/2000 | Lee | F01D 5/189 249/117 |
| 6,260,359 B1 | 7/2001 | Monty et al. | |
| 6,279,323 B1 | 8/2001 | Monty et al. | |
| 6,402,464 B1 | 6/2002 | Chiu et al. | |
| 6,438,958 B1 | 8/2002 | McCaffrey et al. | |
| 6,465,090 B1 * | 10/2002 | Stowell | C23C 24/08 428/325 |
| 6,468,669 B1 | 10/2002 | Hasz et al. | |
| 6,519,850 B2 | 2/2003 | Mc Caffrey et al. | |
| 6,568,079 B2 | 5/2003 | Farmer et al. | |
| 6,581,285 B2 | 6/2003 | Emilianowicz | |
| 6,655,146 B2 | 12/2003 | Kutter et al. | |
| 6,904,676 B2 | 6/2005 | Emilianowicz | |
| 6,910,620 B2 | 6/2005 | Hasz et al. | |
| 6,925,711 B2 | 8/2005 | Kilmer et al. | |
| 7,093,439 B2 | 8/2006 | Pacheco-Tougas et al. | |
| 8,256,223 B2 | 9/2012 | Dierberger et al. | |
| 8,722,202 B2 | 5/2014 | Nagaraj et al. | |
| 8,959,887 B2 | 2/2015 | Allam et al. | |
| 2001/0046596 A1 * | 11/2001 | Rettig | F23M 5/00 428/332 |
| 2003/0136547 A1 * | 7/2003 | Gollan | F28F 13/187 165/104.21 |
| 2005/0282020 A1 * | 12/2005 | Stowell | C23C 28/3455 428/446 |
| 2008/0149313 A1 * | 6/2008 | Slaughter | F28F 3/048 165/148 |
| 2009/0183850 A1 | 7/2009 | Morrison et al. | |
| 2010/0162715 A1 * | 7/2010 | Nagaraj | F01D 5/288 165/133 |
| 2010/0242485 A1 * | 9/2010 | Davis, Jr. | F23R 3/002 60/752 |
| 2011/0033312 A1 * | 2/2011 | Lee | F01D 5/187 416/97 R |
| 2013/0299148 A1 | 11/2013 | Hernon et al. | |
| 2014/0154088 A1 | 6/2014 | Etter et al. | |

FOREIGN PATENT DOCUMENTS

| | | |
|---|---|---|
| CN | 103846437 A | 6/2014 |
| EP | 0819908 A2 | 1/1998 |
| EP | 1202018 A2 | 5/2002 |
| JP | 200112207 | 1/2001 |
| JP | 2004169689 | 6/2004 |
| JP | 2010156327 A | 7/2010 |
| WO | 20140052966 A1 | 4/2014 |
| WO | 20140055887 A2 | 4/2014 |

OTHER PUBLICATIONS

Japanese Office Action dated Nov. 9, 2016, issued in the corresponding Japanese Patent Application No. 2015-137362.
Japanese Office Action dated Dec. 19, 2017, issued in the corresponding Japanese Patent Application No. 2015-137362.
Chinese Office Action dated Oct. 9, 2018 issued in the corresponding Chinese Patent Application No. 201510561016.4.
Japanese Office Action dated Jun. 19, 2018 issued in the corresponding Japanese Patent Application No. 2015-137362.
European Office Action dated May 2, 2019, issued in the corresponding European Patent Application No. 15176665.6.

* cited by examiner

ADDITIVE MANUFACTURED SURFACE FINISH

CROSS REFERENCE TO RELATED APPLICATION

This application claims the benefit of provisional application Ser. No. 62/024,023, filed Jul. 14, 2014.

BACKGROUND

The present disclosure relates to a gas turbine engine and, more particularly, to additive manufacturing control of a surface finish therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Combustors are subject to high thermal loads for prolonged time periods. Historically, combustors have implemented various cooling arrangements to cool the combustor liner assemblies. Among these is a double-walled assembly approach where liner panels directly adjacent to the combustion gases are cooled via impingement on the backside and film cooled on the gas side to maintain temperatures within material limits.

Given the harsh thermal and operating environment, liner panels are constructed of high-temperature alloys, e.g. nickel, cobalt, in the form of investment castings or elaborate sheet metal fabrications. The temperatures in the combustor often may exceed the temperature of the base metal so liner panels accommodate cooling holes to provide film cooling. The combustor shell may also include impingement cooling holes that introduce cooling air jets onto a back surface of the liner panels.

To still further increase cooling effectiveness, surface augmentation on the back surface in the form of very small features such as pins, cylinders, pyramids and/or rectangular geometries may also be provided. These features offer an effective area increase for heat transfer. Optimization of features such as these is currently limited by reliability, accuracy, and cost of conventional manufacturing methods/tooling.

SUMMARY

An additively manufactured component according to one disclosed non-limiting embodiment of the present disclosure includes, a heat transfer augmentation feature with a surface finish between about 125-900 micro inches.

A further embodiment of the present disclosure includes wherein the heat transfer augmentation feature is a pin.

A further embodiment of any of the foregoing embodiments of the present disclosure includes wherein the heat transfer augmentation feature is a fin.

A further embodiment of any of the foregoing embodiments of the present disclosure includes wherein the surface finish includes a defined contour.

A further embodiment of any of the foregoing embodiments of the present disclosure includes wherein the surface finish includes a chevron.

A further embodiment of any of the foregoing embodiments of the present disclosure includes, wherein the surface finish includes a bump.

A further embodiment of any of the foregoing embodiments of the present disclosure includes wherein the surface finish includes a hallow.

A further embodiment of any of the foregoing embodiments of the present disclosure includes, wherein the surface finish includes a dimple.

A further embodiment of any of the foregoing embodiments of the present disclosure includes, wherein the heat transfer augmentation feature includes a passage.

A further embodiment of any of the foregoing embodiments of the present disclosure includes, wherein the surface finish is arranged with respect to an airflow.

An component according to another disclosed non-limiting embodiment of the present disclosure includes an additively manufactured surface finish, said surface finish includes a defined contour.

A further embodiment of any of the foregoing embodiments of the present disclosure includes, wherein the surface finish is about between about 125-900 micro inches.

A further embodiment of any of the foregoing embodiments of the present disclosure includes, wherein the surface finish is on a heat transfer augmentation feature of the additively manufactured component.

A further embodiment of any of the foregoing embodiments of the present disclosure includes, wherein the surface finish is on a heat transfer augmentation feature of the additively manufactured component.

A method of manufacturing a component according to another disclosed non-limiting embodiment of the present disclosure includes an additively manufacturing a component with a surface finish having a defined contour.

A further embodiment of any of the foregoing embodiments of the present disclosure includes applying the surface finish to a heat transfer augmentation feature of the additively manufactured component.

A further embodiment of any of the foregoing embodiments of the present disclosure includes applying the surface finish to a fin of the additively manufactured component.

A further embodiment of any of the foregoing embodiments of the present disclosure includes controlling the surface finish with respect to an airflow.

A further embodiment of any of the foregoing embodiments of the present disclosure includes applying the surface finish within a passage.

A further embodiment of any of the foregoing embodiments of the present disclosure includes controlling the surface finish to be within about 125-900 micro inches.

The foregoing features and elements may be combined in various combinations without exclusivity, unless expressly indicated otherwise. These features and elements as well as the operation of the invention will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
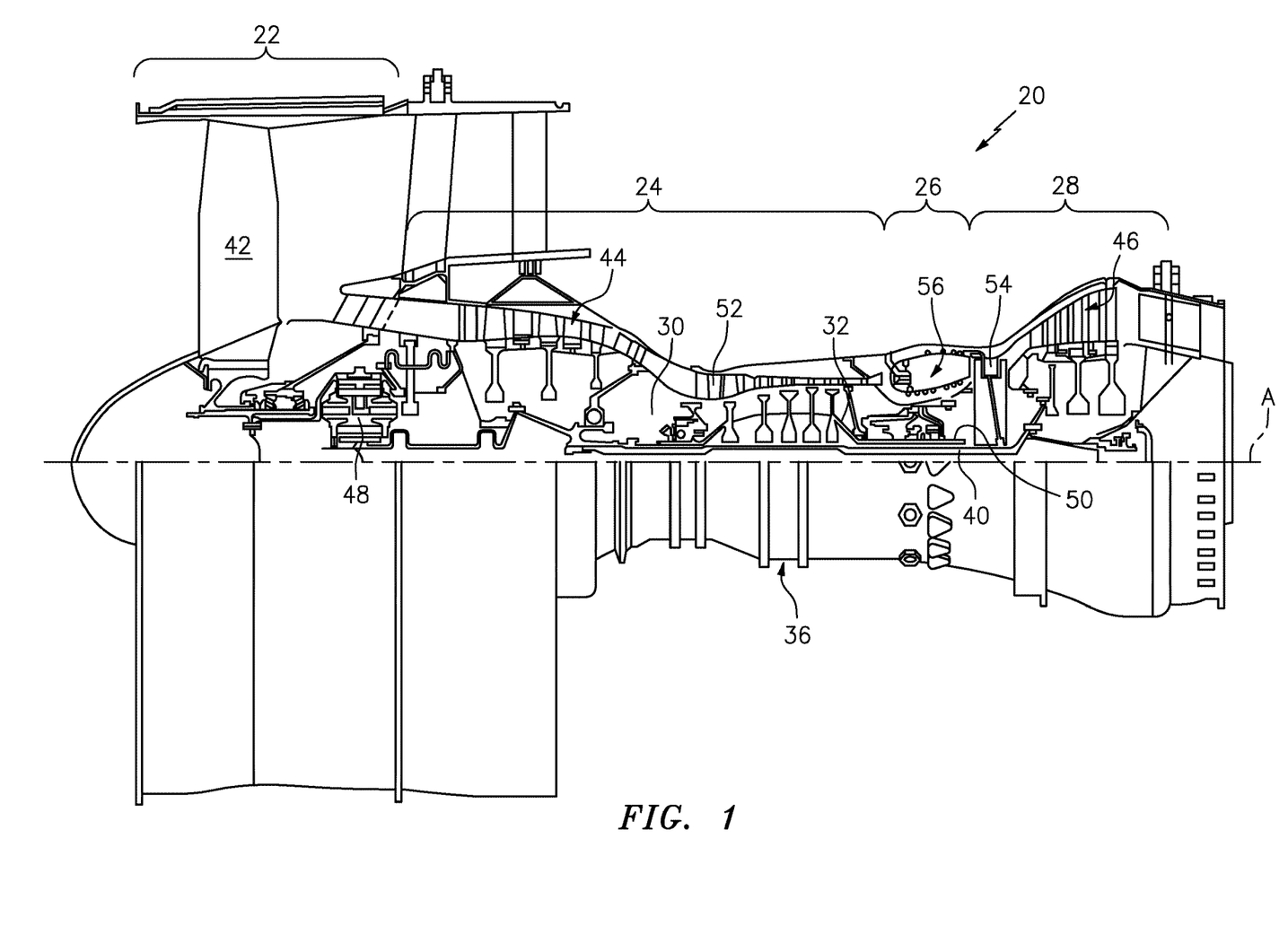
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath and a core flowpath. The compressor section 24 compresses the air along the core flowpath for communication into the combustor section 26, then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans.

The engine 20 generally includes a low spool 30 and a high spool 32 mounted for rotation about an engine central longitudinal axis A relative to an engine static structure 36. The low spool 30 generally includes an inner shaft 40 that interconnects a fan 42, a low pressure compressor ("LPC") 44 and a low pressure turbine ("LPT") 46. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and high pressure turbine ("HPT") 54. A combustor 56 is arranged between the HPC 52 and the HPT 54. The inner shaft 40 and the outer shaft 50 are concentric and rotate about the engine central longitudinal axis A.

Core airflow is compressed by the LPC 44 then the HPC 52, mixed with the fuel and burned in the combustor 56, then expanded through the HPT 54 and the LPT 46. The LPT 46 and the HPT 54 rotationally drive the respective low spool 30 and high spool 32 in response to the expansion.

Figure 2:
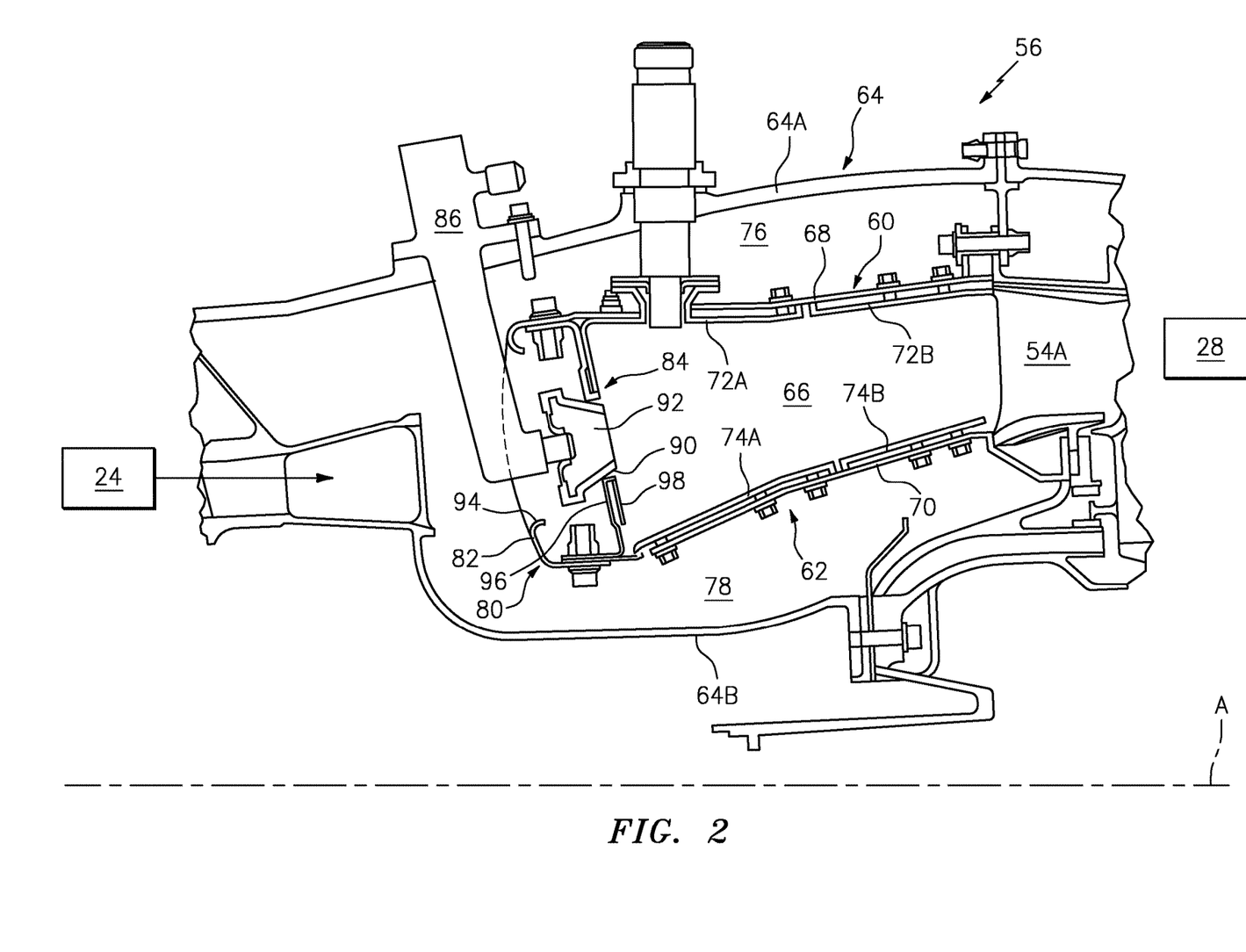
FIG. 2 is an expanded longitudinal schematic sectional view of a combustor section according to one non-limiting embodiment that may be used with the gas turbine engine shown in FIG. 1.

With reference to FIG. 2, the combustor 56 generally includes an outer combustor wall assembly 60, an inner combustor wall assembly 62 and a diffuser case module 64. The outer combustor wall assembly 60 and the inner combustor wall assembly 62 are spaced apart such that a combustion chamber 66 is defined therebetween. The combustion chamber 66 is generally annular in shape.

The outer combustor wall assembly 60 is spaced radially inward from an outer diffuser case 64A of the diffuser case module 64 to define an outer annular plenum 76. The inner combustor wall assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom.

Figure 3:
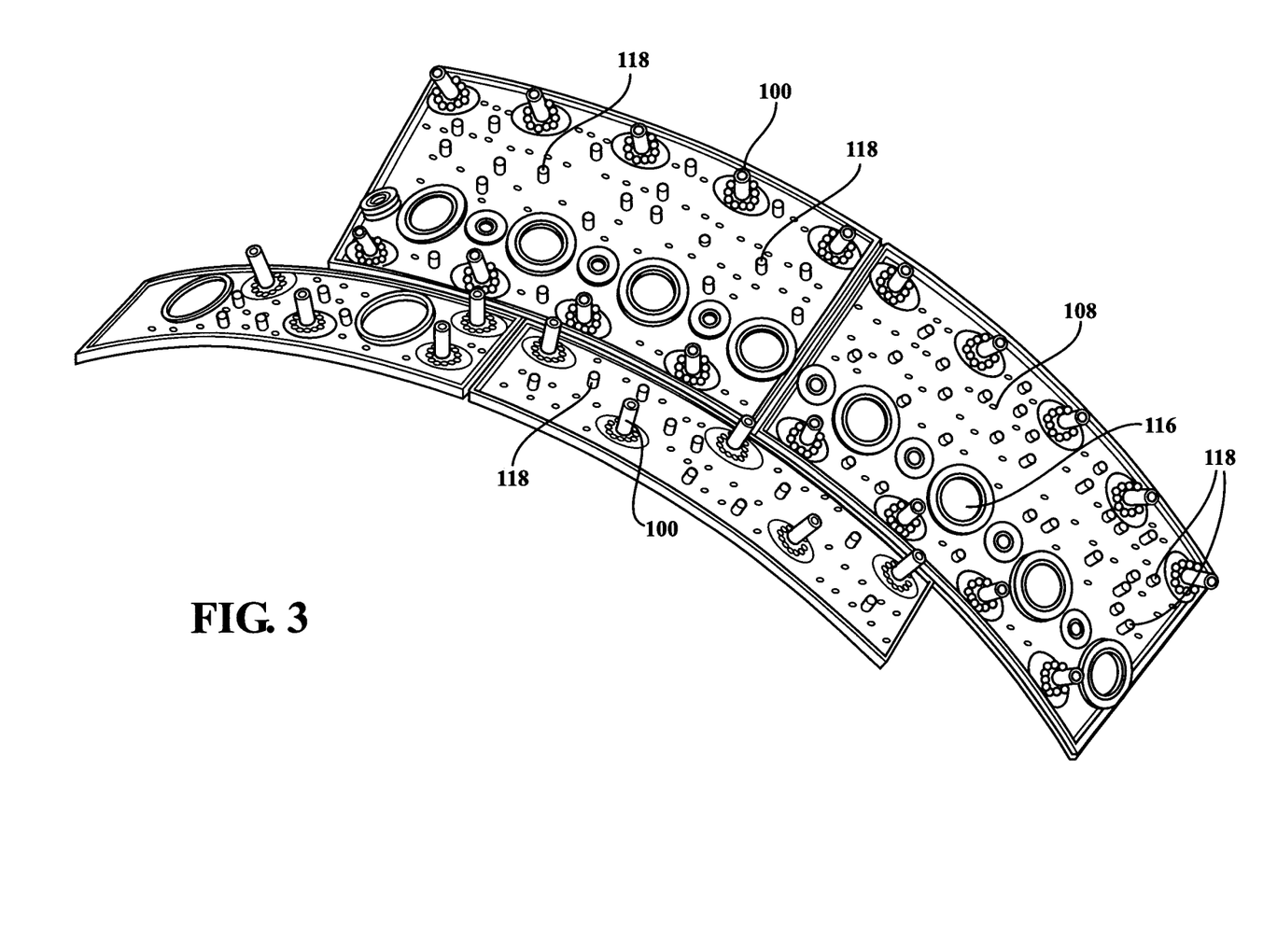
FIG. 3 is an expanded perspective view of a liner panel array from a cold side.

The combustor liner assemblies 60, 62 contain the combustion products for direction toward the turbine section 28. Each combustor wall assembly 60, 62 generally includes a respective support shell 68, 70 that supports one or more liner panels 72, 74 mounted to a hot side of the respective support shell 68, 70. Each of the liner panels 72, 74 may be generally rectilinear and manufactured of, for example, a nickel based super alloy, ceramic or other temperature resistant material and are arranged to form a liner array. In one disclosed non-limiting embodiment, the liner array includes a multiple of forward liner panels 72A and a multiple of aft liner panels 72B that are circumferentially staggered to line the hot side of the outer shell 68 (also shown in FIG. 3). A multiple of forward liner panels 74A and a multiple of aft liner panels 74B are circumferentially staggered to line the hot side of the inner shell 70.

The combustor 56 further includes a forward assembly 80 immediately downstream of the compressor section 24 to receive compressed airflow therefrom. The forward assembly 80 generally includes an annular hood 82, a bulkhead assembly 84, a multiple of fuel nozzles 86 (one shown) and a multiple of fuel nozzle guides 90 (one shown). Each of the fuel nozzle guides 90 is circumferentially aligned with one of the hood ports 94 to project through the bulkhead assembly 84. Each bulkhead assembly 84 includes a bulkhead support shell 96 secured to the combustor liner assemblies 60, 62, and a multiple of circumferentially distributed bulkhead liner panels 98 secured to the bulkhead support shell 96 around the central opening 92.

The annular hood 82 extends radially between, and is secured to, the forwardmost ends of the combustor liner assemblies 60, 62. The annular hood 82 includes a multiple of circumferentially distributed hood ports 94 that accommodate the respective fuel nozzle 86 and introduce air into the forward end of the combustion chamber 66 through a central opening 92. Each fuel nozzle 86 may be secured to the diffuser case module 64 and project through one of the hood ports 94 and through the central opening 92 within the respective fuel nozzle guide 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of HPT rotor rotation.

Figure 4:
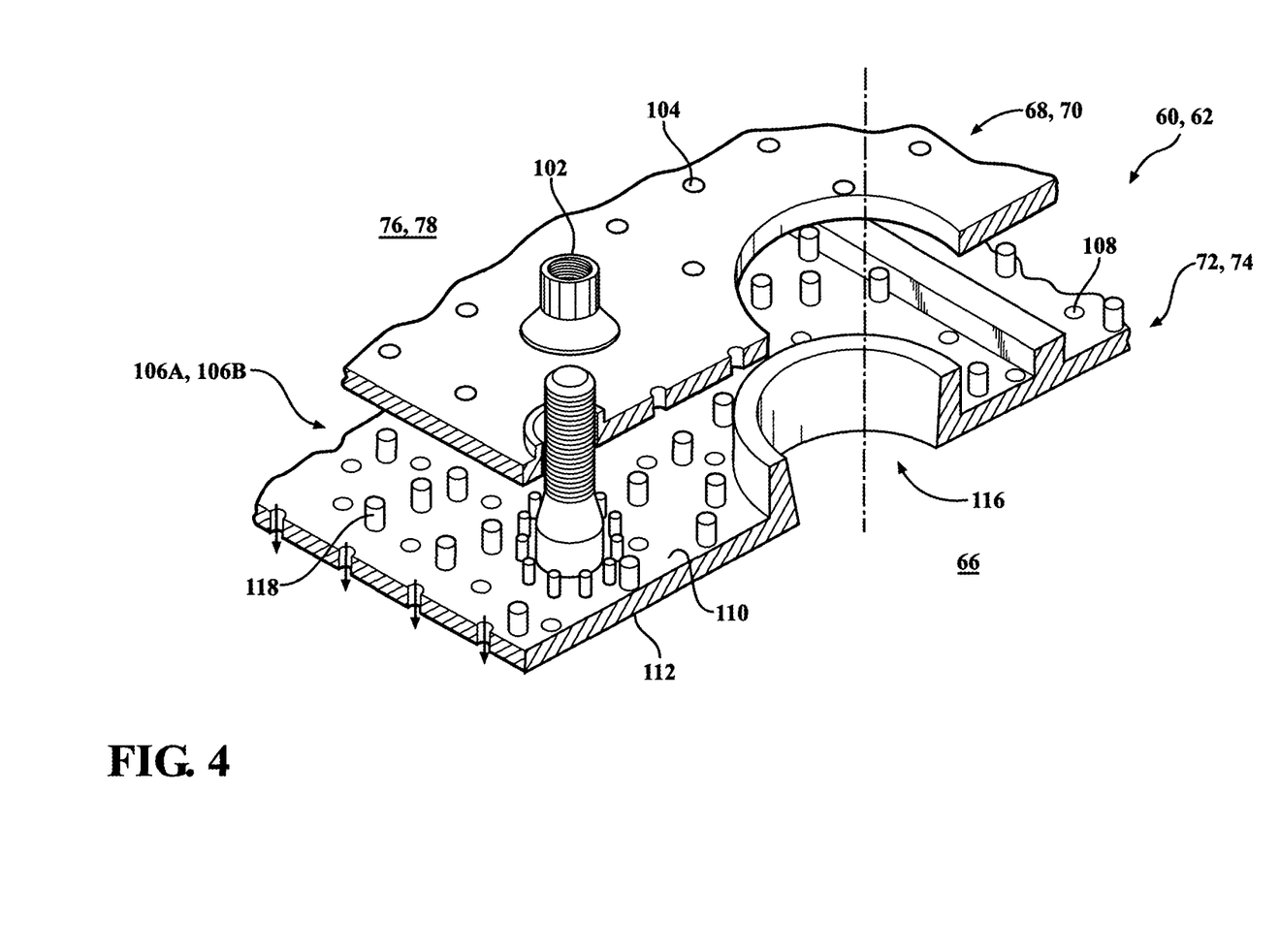
FIG. 4 is an exploded view of a wall assembly of the combustor.

With reference to FIG. 4, a multiple of studs 100 extend from the liner panels 72, 74 so as to permit the liner panels 72, 74 to be mounted to their respective support shells 68, 70 with fasteners 102 such as nuts. That is, the studs 100 project rigidly from the liner panels 72, 74 and through the respective support shells 68, 70 to receive the fasteners 102 at a threaded distal end section thereof.

A multiple of cooling impingement holes 104 penetrate through the support shells 68, 70 to allow air from the respective annular plenums 76, 78 to enter cavities 106A, 106B formed in the combustor liner assemblies 60, 62 between the respective support shells 68, 70 and liner panels 72, 74. The cooling impingement holes 104 are generally normal to the surface of the liner panels 72, 74. The air in the cavities 106A, 106B provides backside impingement cooling of the liner panels 72, 74 that is generally defined herein as heat removal via internal convection.

A multiple of cooling film holes 108 penetrate through each of the liner panels 72, 74. The geometry of the film holes, e.g, diameter, shape, density, surface angle, incidence angle, etc., as well as the location of the holes with respect to the high temperature main flow also contributes to effusion film cooling. The combination of impingement holes 104 and film holes 108 may be referred to as an Impingement Film Floatwall assembly.

The cooling film holes 108 allow the air to pass from the cavities 106A, 106B defined in part by a cold side 110 of the liner panels 72, 74 to a hot side 112 of the liner panels 72, 74 and thereby facilitate the formation of a film of cooling air along the hot side 112. The cooling film holes 108 are generally more numerous than the impingement holes 104 to promote the development of a film cooling along the hot side 112 to sheath the liner panels 72, 74. Film cooling as defined herein is the introduction of a relatively cooler airflow at one or more discrete locations along a surface exposed to a high temperature environment to protect that surface in the immediate region of the airflow injection as well as downstream thereof.

A multiple of dilution holes 116 penetrate through both the respective support shells 68, 70 and liner panels 72, 74 along a common axis to quench or otherwise effect the hot gases by direct supply of cooling air into the combustion chamber 66.

A multiple of heat transfer augmentation feature 118 extends from the cold side 110 of each liner panel 72, 74. Various shapes, heights, widths and lengths of heat transfer augmentation features 118 may be utilized. Furthermore, various distributions and combination of the heat transfer augmentation features 118 may be utilized in either or both the circumferential or spanwise direction.

The support shells 68, 70 and liner panels 72, 74, in this disclosed non-limiting example, are manufactured via an additive manufacturing process that beneficially permits incorporation of the relatively small heat transfer augmentation features 118 as well as the cooling impingement holes 104, the cooling film holes 108 and/or dilution holes 116 during manufacture.

The additive manufacturing process includes, but is not limited to, Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD) and Laser Powder Bed Fusion (LPBF). The additive manufacturing process sequentially builds-up layers of atomized alloy and/or ceramic powder material that include but are not limited to, 625 Alloy, 718 Alloy, 230 Alloy, stainless steel, tool steel, cobalt chrome, titanium, nickel, aluminum, Waspaloy, Stellite, Titanium, Steels, Stainless Steels, Cobalt Chrome, Hastalloy X, and others. Alloys such as 625, 718 and 230 may have specific benefit for parts that operate in high temperature environments, such as, for example, environments typically encountered by aerospace and gas turbine engine components.

The heat transfer augmentation features 118, be they pins, cylinders, pyramids, rectangular and/or other geometries, as well as the holes 104, 108, 116 are thereby embedded in or inherent to the layered metal fabrication architecture. The heat transfer augmentation features 118, in one disclosed non-limiting embodiment, is between about 0.01"-1.0" (0.254-25.4 mm) in thickness or diameter. It should be appreciated that various geometries for what is generically defined herein as heat transfer augmentation features 118 will also benefit herefrom.

In other words, the aforementioned techniques have the "print resolution" to melt, sinter or weld the powered metal in specific area and at target dimensions to provide the requisite heat transfer augmentation features 118. These techniques have layer resolution on the order of 20-50 microns which in adequate to generate well-defined shapes that have benefits as heat transfer augmentation features 118. Direct Metal Laser Sintering (DMLS) is a free form fabrication, powder-bed manufacturing process. Hardware is built up in a layer-by-layer fashion with a process that starts by slicing a CAD file into 20 μm (0.8 mils) or larger layers. This altered CAD file is loaded into the DMLS machine which builds the hardware one layer at a time, as defined by the new CAD file. Electron beam melting (EBM) is a powder bed additive manufacturing process. EBM, however, uses an electron beam to melt powdered metal deposited layer by layer in a vacuum to build up three dimensional parts. A CAD file is sliced into 50 μm or 70 μm (2.0 mils or 2.8 mils) thick layers, stored as STL files, which are then loaded into the EBM machine. An electron beam is generated by running a current through a tungsten filament, then creating a potential across it to rip off the electrons. The electrons are steered and focused to the build plate by magnetic fields. The lack of moving parts allows for very fast scanning speeds up to 8000 m/s.

Figure 5:
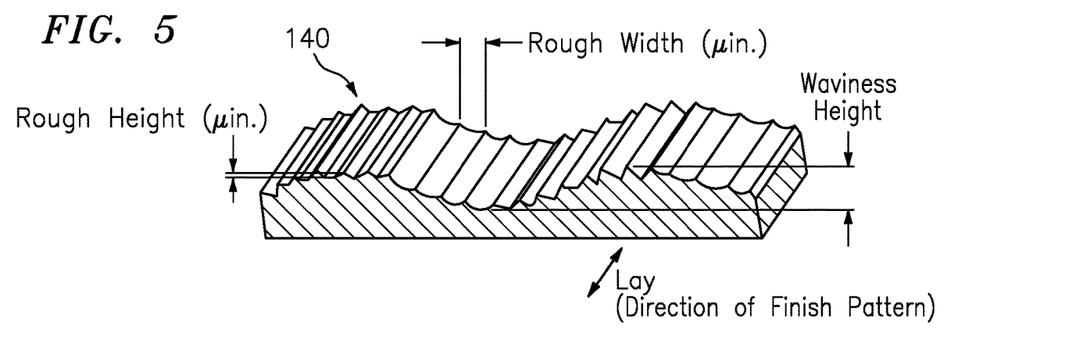
FIG. 5 is an expanded perspective view of an example surface finish.

Utilization of the additive manufacturing process to manufacture components such as the support shells 68, 70 and liner panels 72, 74 also provides for specific control of a surface finish 140 (FIG. 5). The surface finish 140 defines a surface roughness of texture that is a measure if the finer surface irregularities in the surface texture and is composed of three components: roughness, waviness and form. These are the result of the manufacturing process, here an additive manufacturing process, employed to create the surface. Surface roughness average (Ra), also know as arithmetic average (AA) is rated as the arithmetic average deviation of the surface valleys and peaks expressed in micro inches or micro meters. ISO standards use the term CLA (Center Line Average). As readily understood, 1 micro inch=0.000001 inches (1 millionth of an inch).

In one disclosed non-limiting embodiment, the desired surface finish 140 may be controlled via the additive manufacturing process. That is, for example, the heat transfer augmentation features 118 may be additively manufactured with a specific surface finish 140. Through control of the surface finish 140, the surface area is selectively controlled to thereby control airflow turbulence to tailor the heat transfer in a localized, or generalized manner.

Figure 6:
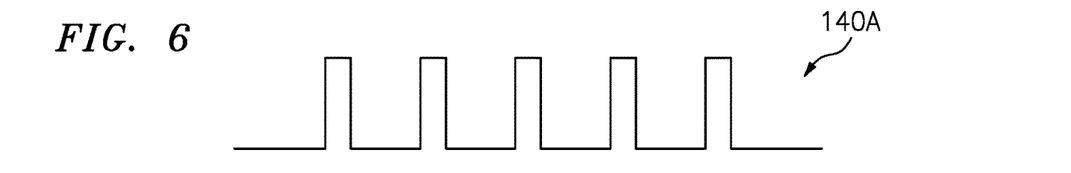
FIGS. 6-11 are schematic views of example surface finish contours for an additively manufactured component.
Figure 7:
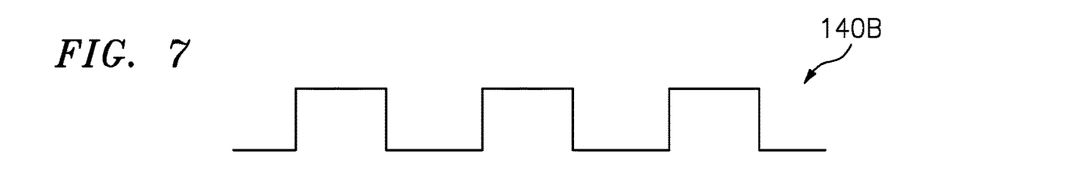
Figure 8:
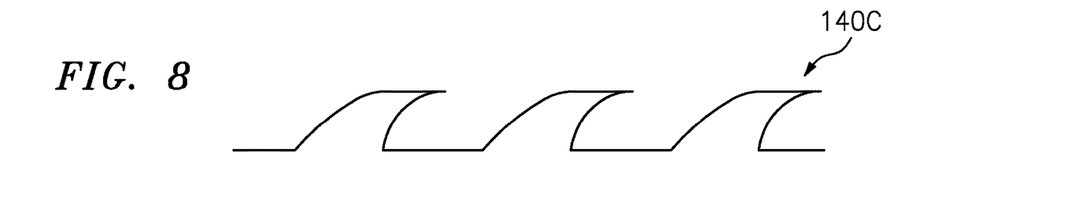
Figure 9:
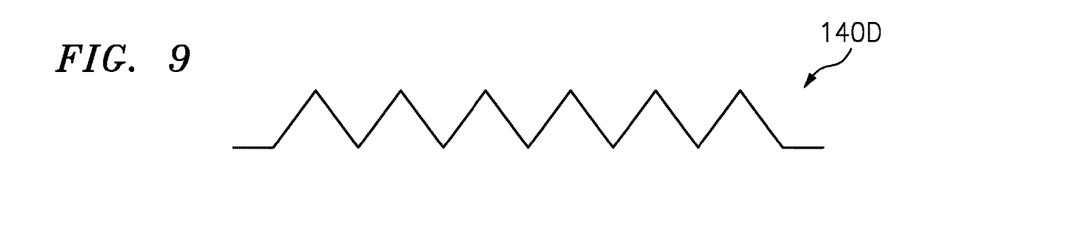
Figure 10:
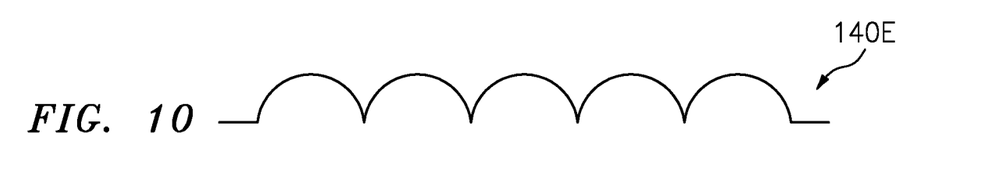
Figure 11:
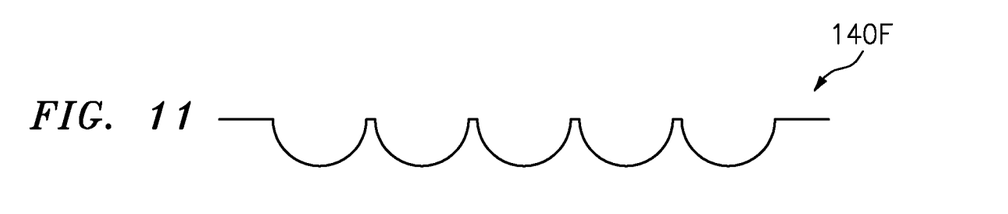

While performing additive manufacturing, the surface finish 140, in one disclosed non-limiting embodiment, is controlled to be within about 125-900 micro inches. Further, the desired surface finish 140 may be any one or more of a defined contour 142 such as, for example, fins 140A (FIG. 6), pins 140B (FIG. 7), hooks 140C (FIG. 8), chevrons 140D (FIG. 9), bumps 140E (FIG. 10), dimples 140F (FIG. 11), etc., that are defined with respect to an airflow W (FIG. 12).

Figure 12:
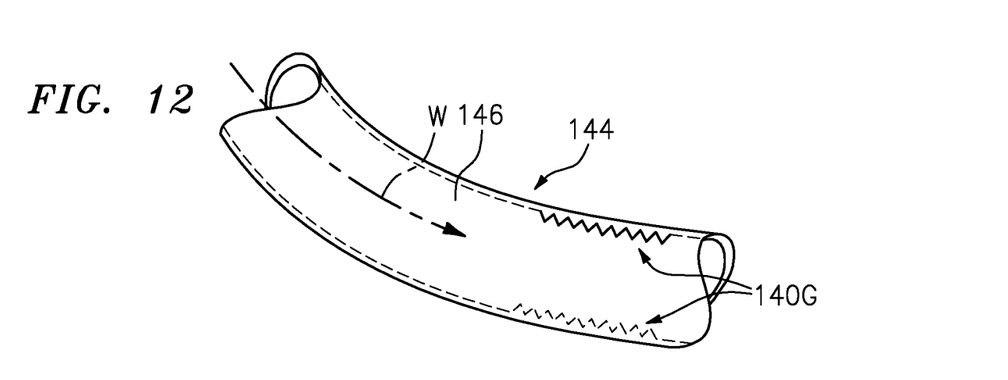
FIG. 12 is a schematic view of a passage with a localized additively manufactured surface finish.

With reference to FIG. 12, in one disclosed non-limiting embodiment, the surface finish 140G is applied within a passage 144. The surface finish 140 may be localized such as adjacent to a bend 146 to facilitate a flow therethrough.

Figure 13:
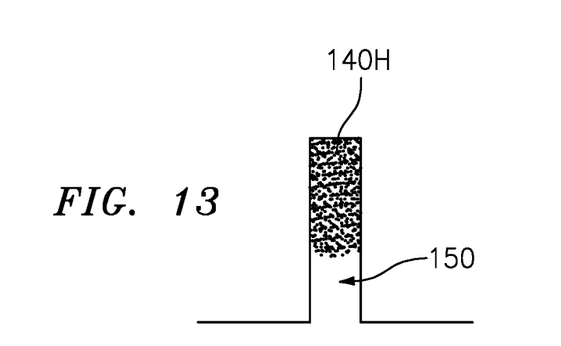
FIG. 13 is a schematic view of a heat transfer augmentation feature with an additively manufactured surface finish.

With reference to FIG. 13, in another disclosed non-limiting embodiment, the surface finish 140H is applied to a fin 150. The fin 150, manufactured via additive manufacturing, may be about 0.02 inches (2 thou; 0.5 mm) thick. It should be appreciated although one fin 150 is illustrated, numerous such fins may be additively manufactured as typical of a heat exchanger or other such device.

Additively manufactured surface finish control is operable to, for example, optimized heat transfer, reduces manufacturing costs, reduce operations, increase part life, control local flow, control local turbulence and/or other structural benefits. It should be appreciated that although described herein with respect to particular components additive manufacturing control of a surface finish is readily applicable to any industry—aerospace, HVAC, automotive and industrial, power generation, motors, missiles/rockets, defense, electronic thermal management, etc.

The use of the terms "a," "an," "the," and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. An additively manufactured component, comprising:
a heat transfer augmentation feature with an additively manufactured surface finish that defines a surface roughness average (Ra) between 125-900 micro inches, wherein said additively manufactured surface finish includes a defined contour arranged with respect to an airflow to control the airflow turbulence to tailor a heat transfer.

2. The component as recited in claim 1, wherein said heat transfer augmentation feature is a pin.

3. The component as recited in claim 1, wherein said heat transfer augmentation feature is a fin.

4. The component as recited in claim 1, wherein said surface finish includes a chevron.

5. The component as recited in claim 1, wherein said surface finish includes a bump.

6. The component as recited in claim 1, wherein said surface finish includes a hallow.

7. The component as recited in claim 1, wherein said surface finish includes a dimple.

8. The component as recited in claim 1, wherein said heat transfer augmentation feature includes a passage.

9. The component as recited in claim 1, wherein the defined contour provides a change in a surface area.

10. The component as recited in claim 1, wherein said component is a support shell of a gas turbine engine combustor.

11. The component as recited in claim 1, wherein said component is a liner panel of a gas turbine engine combustor.

12. A heat transfer augmentation feature of an additively manufactured component, comprising:
an additively manufactured surface finish that defines a surface roughness average (Ra) between 125-900 micro inches, wherein said additively manufactured surface finish includes a defined contour arranged with respect to an airflow to control the airflow turbulence to tailor a heat transfer.

13. A method of manufacturing a component, comprising:
additively manufacturing a component with an additively manufactured surface finish having a defined contour that defines a surface roughness average (Ra) between 125-900 micro inches, wherein said additively manufactured surface finish includes a defined contour arranged with respect to an airflow to control the airflow turbulence to tailor a heat transfer, and
applying the surface finish to a heat transfer augmentation feature of the additively manufactured component.

14. The method as recited in claim 13, further comprising:
applying the surface finish to a fin of the additively manufactured component.

15. The method as recited in claim 13, further comprising:
controlling the surface finish with respect to an airflow.

16. The method as recited in claim 13, further comprising:
applying the surface finish within a passage of the component.

17. The method as recited in claim 13, further comprising:
controlling the surface finish to be within about 125-900 micro inches.

* * * * *